US010935395B2

(12) United States Patent
Okada

(10) Patent No.: US 10,935,395 B2
(45) Date of Patent: Mar. 2, 2021

(54) ROTATIONAL ANGLE DETECTION DEVICE

(71) Applicant: Panasonic Intellectual Property Management Co., Ltd., Osaka (JP)

(72) Inventor: Mayuko Okada, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 77 days.

(21) Appl. No.: 16/551,815

(22) Filed: Aug. 27, 2019

(65) Prior Publication Data

US 2019/0383642 A1    Dec. 19, 2019

Related U.S. Application Data

(63) Continuation of application No. PCT/JP2018/003936, filed on Feb. 6, 2018.

(30) Foreign Application Priority Data

Mar. 7, 2017 (JP) .............................. JP2017-043116

(51) Int. Cl.
*G01D 5/14* (2006.01)
(52) U.S. Cl.
CPC ...................................... *G01D 5/14* (2013.01)
(58) Field of Classification Search
CPC ....................................................... G01D 5/14
See application file for complete search history.

(56) References Cited

U.S. PATENT DOCUMENTS 7,436,174 B2 * 10/2008 Shiraga .............. B62D 15/0215
324/207.21
7,535,219 B2 * 5/2009 Shiraga .............. B62D 15/0215
324/207.25

(Continued)

FOREIGN PATENT DOCUMENTS

JP        2013-200241       10/2013

OTHER PUBLICATIONS

International Search Report of PCT application No. PCT/JP2018/003936 dated Mar. 13, 2018.

*Primary Examiner* — Walter L Lindsay, Jr.
*Assistant Examiner* — Milton Gonzalez
(74) *Attorney, Agent, or Firm* — Greenblum & Bernstein, P.L.C.

(57) ABSTRACT

A rotational angle detection device includes a first gear that rotates about a first rotation axis and that has a main surface having an annular shape that crosses the first rotation axis and a plurality of first teeth provided on the main surface; a second gear that rotates about a second rotation axis in engagement with the first gear and that has a larger number of second teeth than the first teeth; and a sensor that detects a rotational angle of the second gear. The second rotation axis extends in a direction orthogonal to both of a virtual line that connects a center of the first gear and a position where the first gear and the second gear are engaged with each other, and the first rotation axis. Each of the first teeth extends so as to shift from an outer side toward an inner side in a radial direction of the main surface as it shifts along a circumferential direction of the main surface. Adjacent two of the first teeth are disposed so as to overlap each other in the radial direction.

4 Claims, 9 Drawing Sheets

(56) References Cited

U.S. PATENT DOCUMENTS

| | | | | |
|---|---|---|---|---|
| 7,694,599 B2* | 4/2010 | Brandl | ...................... | F16H 1/24 74/424.5 |
| 9,080,895 B2* | 7/2015 | Martin | ................... | G01D 5/145 |
| 9,097,559 B2* | 8/2015 | Ronnat | ................ | G01D 5/2458 |
| 9,297,670 B2* | 3/2016 | Ishimasa | ................... | G01D 5/04 |
| 9,316,482 B2* | 4/2016 | Delbaere | ................ | G01L 3/104 |
| 2014/0333296 A1* | 11/2014 | Nishioka | ................ | B24B 19/02 324/207.25 |

* cited by examiner

ROTATIONAL ANGLE DETECTION DEVICE

CROSS-REFERENCE TO RELATED APPLICATIONS

This application is a continuation application of the PCT International Application No. PCT/JP2018/003936 filed on Feb. 6, 2018, which claims the benefit of foreign priority of Japanese patent application No. 2017-043116 filed on Mar. 7, 2017, the contents all of which are incorporated herein by reference.

BACKGROUND

1. Technical Field

The present disclosure relates to a rotational angle detection device. For example, the present disclosure relates to a rotational angle detection device for detecting a rotational angle of an object to be detected.

2. Description of the Related Art

For example, a rotational angle detection device disclosed in Unexamined Japanese Patent Publication No. 2013-200241 is known as a conventional rotational angle detection device. This rotational angle detection device includes a rotating body that rotates in association with steering of a vehicle, a first detector and a second detector that rotate in association with the rotating body, and an angle detector that detects rotation of these detectors.

Since the first detector and the second detector are different from each other in terms of a number of teeth, a phase difference of data detected by the angle detector changes in accordance with rotation. This allows the rotational angle detection device to detect a multiple-rotation rotational angle of 360 degrees or more of the steering.

SUMMARY

The rotational angle detection device disclosed in Unexamined Japanese Patent Publication No. 2013-200241 has a complicated structure since the first detector and the second detector are needed to detect a multiple-rotation rotational angle of 360 degrees or more.

The present disclosure provides a rotational angle detection device having a simple configuration that can detect a multiple-rotation rotational angle of 360 degrees or more of an object to be detected.

A rotational angle detection device according to an aspect of the present disclosure has a first gear, a second gear, and a sensor. The first gear is provided so as to be rotatable about a first rotation axis in accordance with rotation of an object to be detected. The first gear has a main surface having an annular shape that crosses the first rotation axis and a plurality of first teeth provided on the main surface. The second gear has second teeth greater in number than the first teeth and is provided so as to be rotatable about a second rotation axis in engagement with the first gear. The sensor detects a rotational angle of the second gear. The second rotation axis extends so as to be orthogonal to both of a virtual line that connects a center of the first gear and a position where the first gear and the second gear are engaged with each other, and the first rotation axis. Each of the plurality of first teeth extends so as to shift from an outer side toward an inner side in a radial direction of the main surface as it shifts along a circumferential direction of the main surface. Adjacent two of the plurality of first teeth are disposed so as to overlap each other in the radial direction.

According to the configuration, a ratio of a rotation number of the first gear to a rotation number of the second gear can be increased. Therefore, the first gear can be rotated by 360 degrees or more while the second gear rotates by 360 degrees. It is therefore possible to detect rotation of 360 degrees or more of an object to be detected linked with the first gear with a simple configuration in which a single second gear is used for the first gear.

DETAILED DESCRIPTION OF PREFERRED EMBODIMENT

Hereinafter, an exemplary embodiment of the present disclosure will specifically be described with reference to the drawings. In the description below, identical or corresponding elements depicted in all of the drawings are denoted by identical reference marks, and a duplicate description of these elements is omitted. For convenience of description, a side on which a second tooth is located relative to a first tooth engaged with the second tooth is referred to as an upper side, and an opposite side is referred to as a lower side. Note, however, that the rotational angle detection device can be used in any directions, and the second tooth is not necessarily located on an upper side relative to the first tooth.

Figure 1:
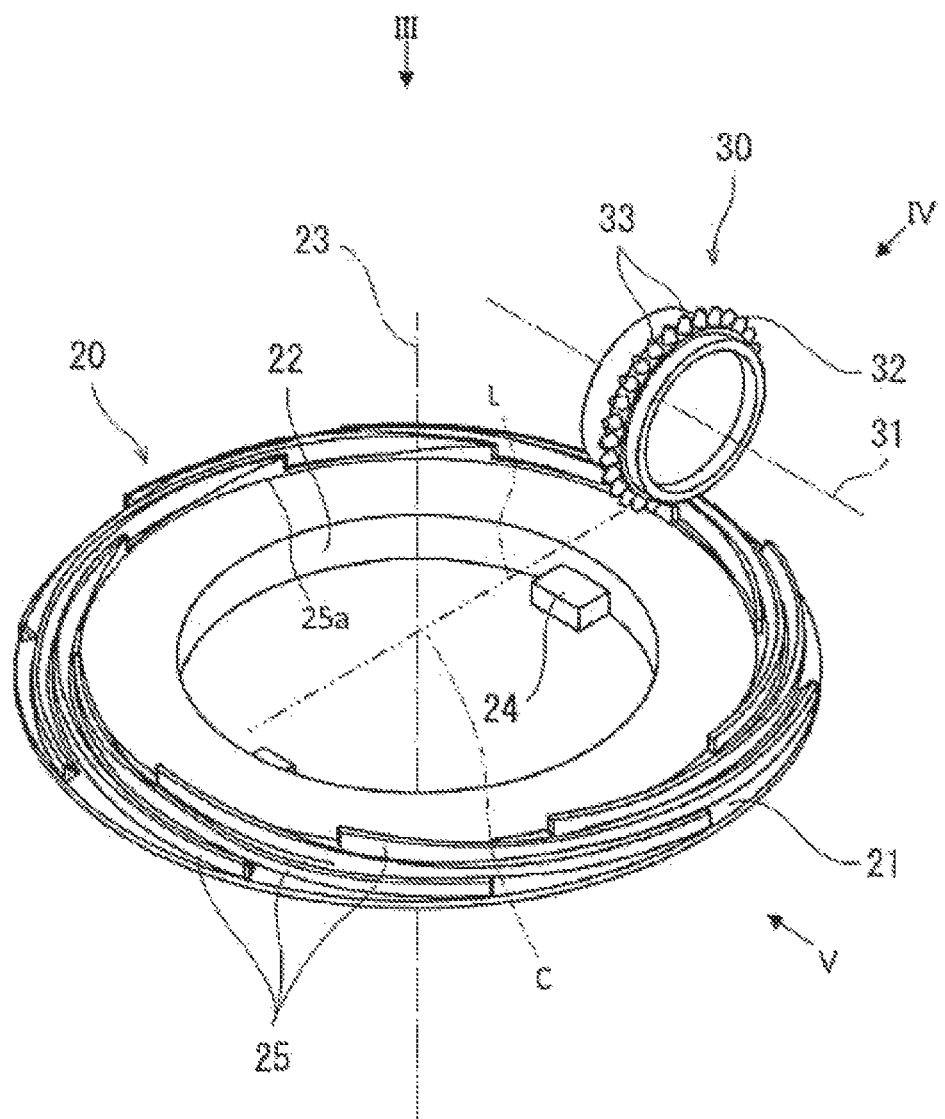
FIG. 1 is a perspective view schematically illustrating part of a rotational angle detection device according to an exemplary embodiment of the present disclosure.
Figure 2A:
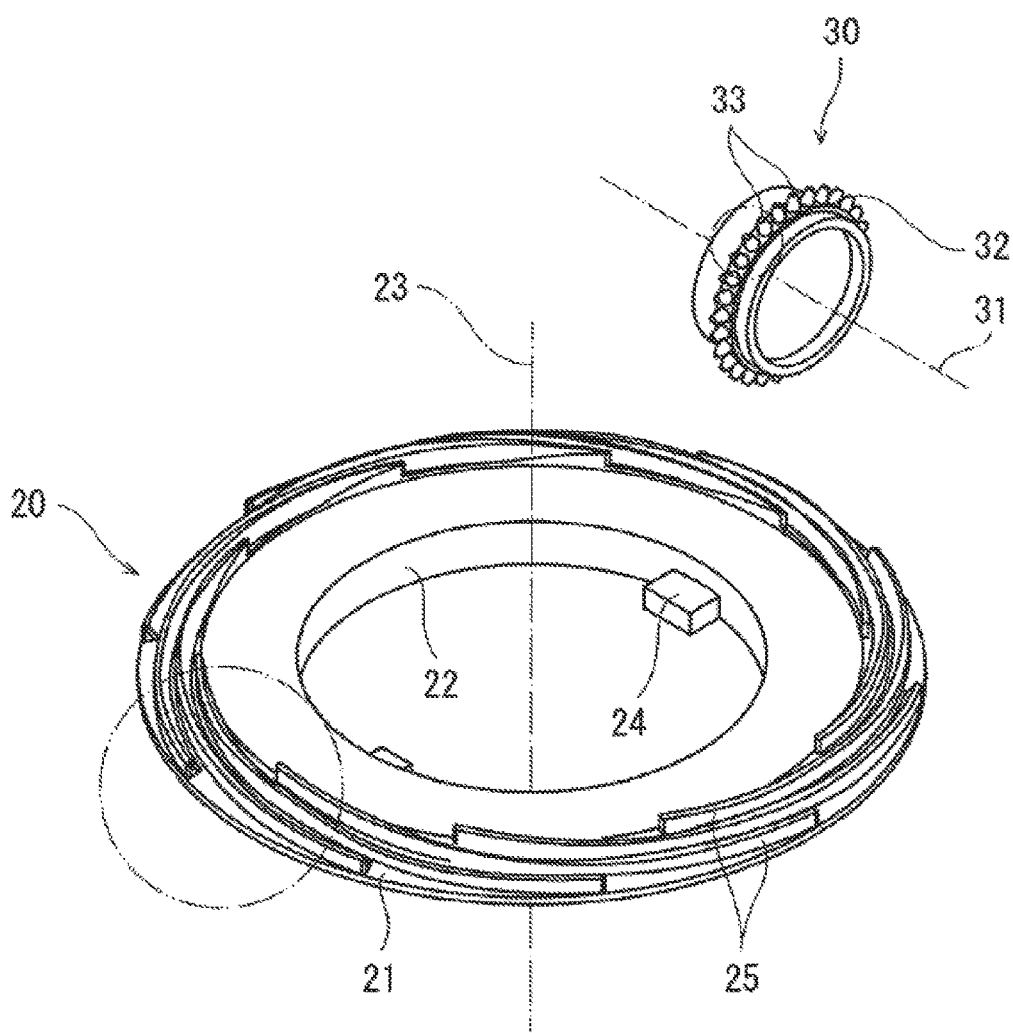
FIG. 2A is an exploded perspective view of the part of the rotational angle detection device illustrated in FIG. 1.
Figure 2B:
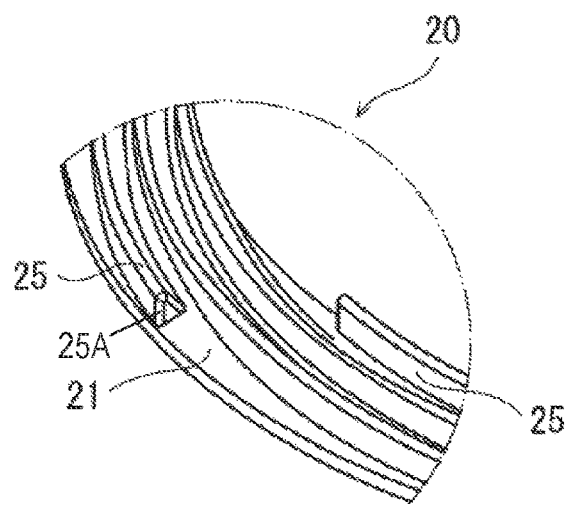
FIG. 2B is a partial enlarged view of a first gear illustrated in FIG. 1.
Figure 2C:
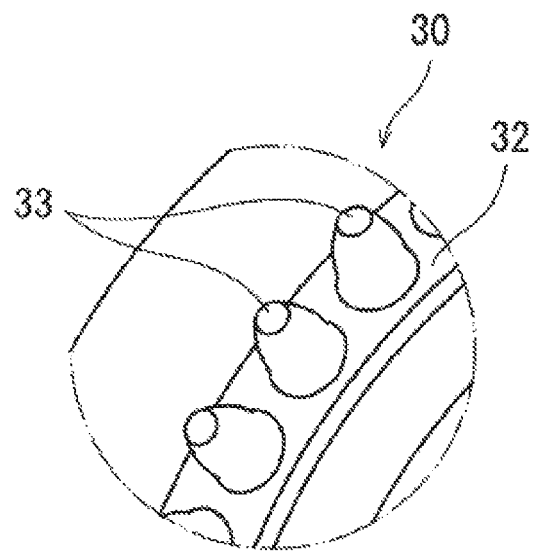
FIG. 2C is a partial enlarged view of a second gear illustrated in FIG. 1.
Figure 2D:
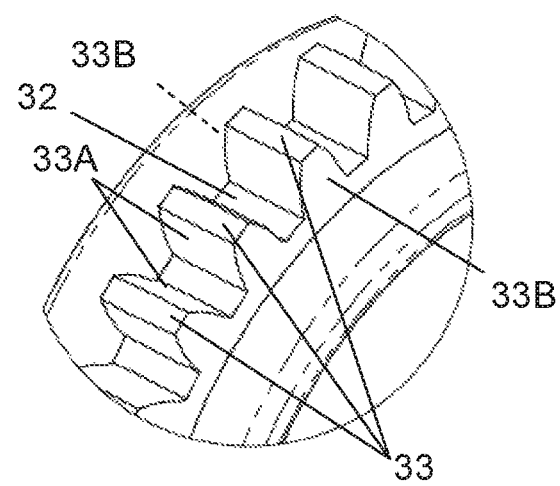
FIG. 2D is a partial enlarged view of another second gear of the rotational angle detection device according to the exemplary embodiment of the present disclosure.
Figure 3:
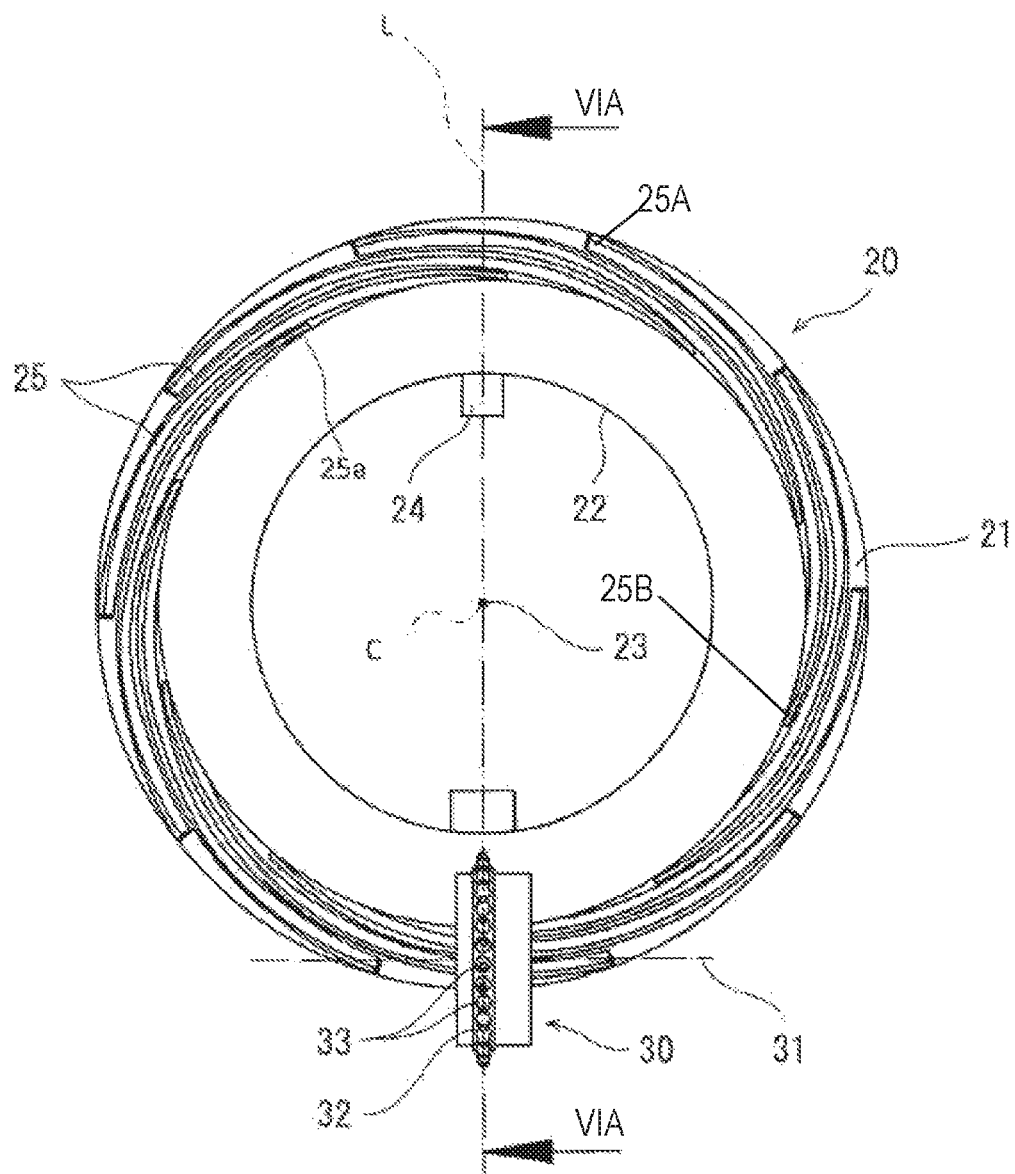
FIG. 3 is a plan view illustrating a configuration of the part of the rotational angle detection device illustrated in FIG. 1 viewed from a direction indicated by arrow III.
Figure 4:
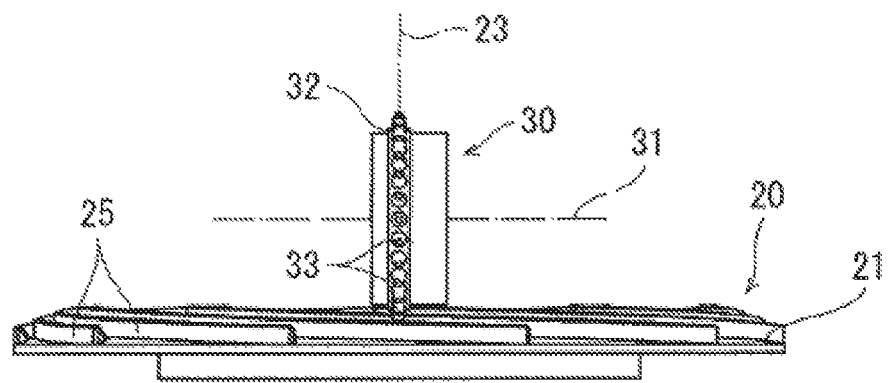
FIG. 4 is a front view illustrating a configuration of the part of the rotational angle detection device illustrated in FIG. 1 viewed from a direction indicated by arrow IV.
Figure 5:
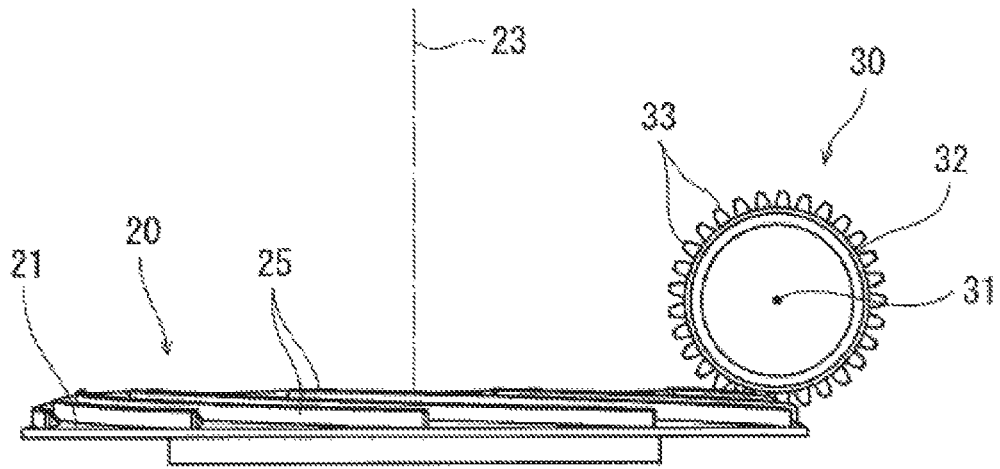
FIG. 5 is a side view illustrating a configuration of the part of the rotational angle detection device illustrated in FIG. 1 viewed from a direction indicated by arrow V.
Figure 6A:
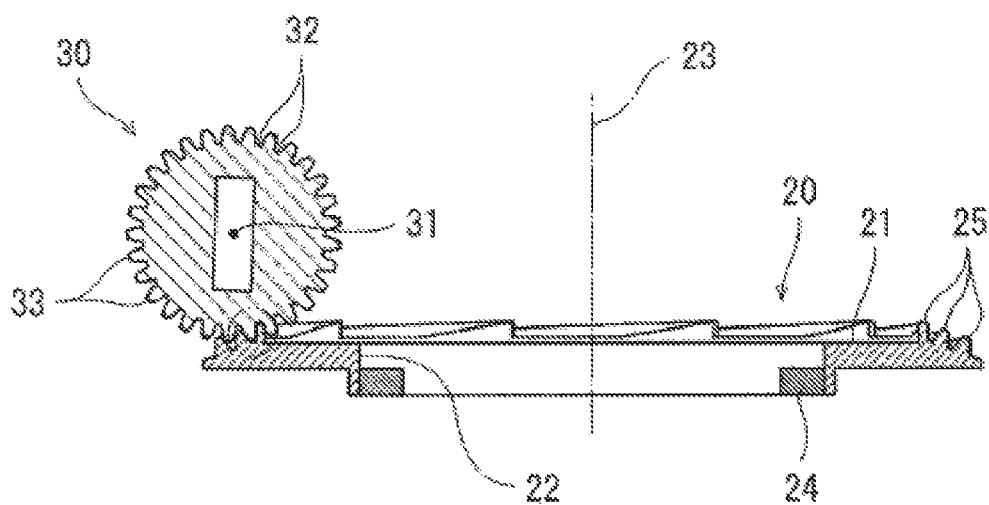
FIG. 6A is a cross-sectional view of the part of the rotational angle detection device taken along line VIA-VIA of FIG. 3.
Figure 6B:
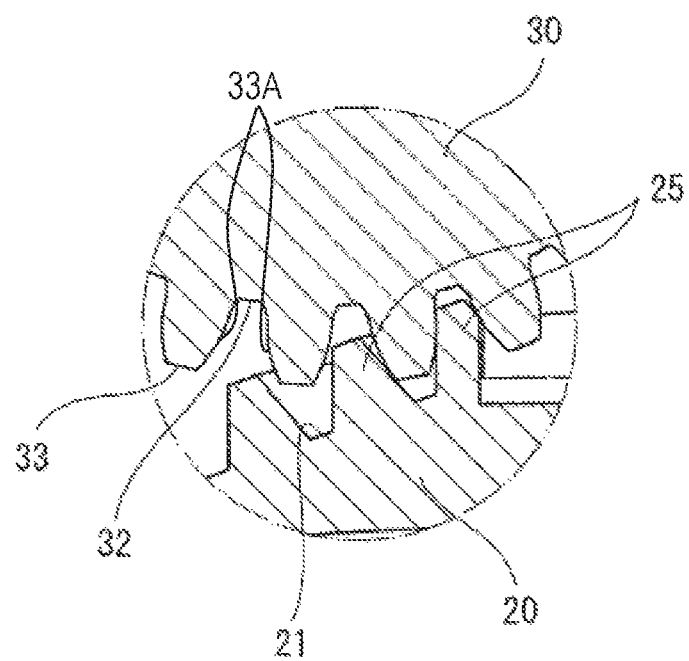
FIG. 6B is a partial enlarged view of FIG. 6A.
Figure 7:
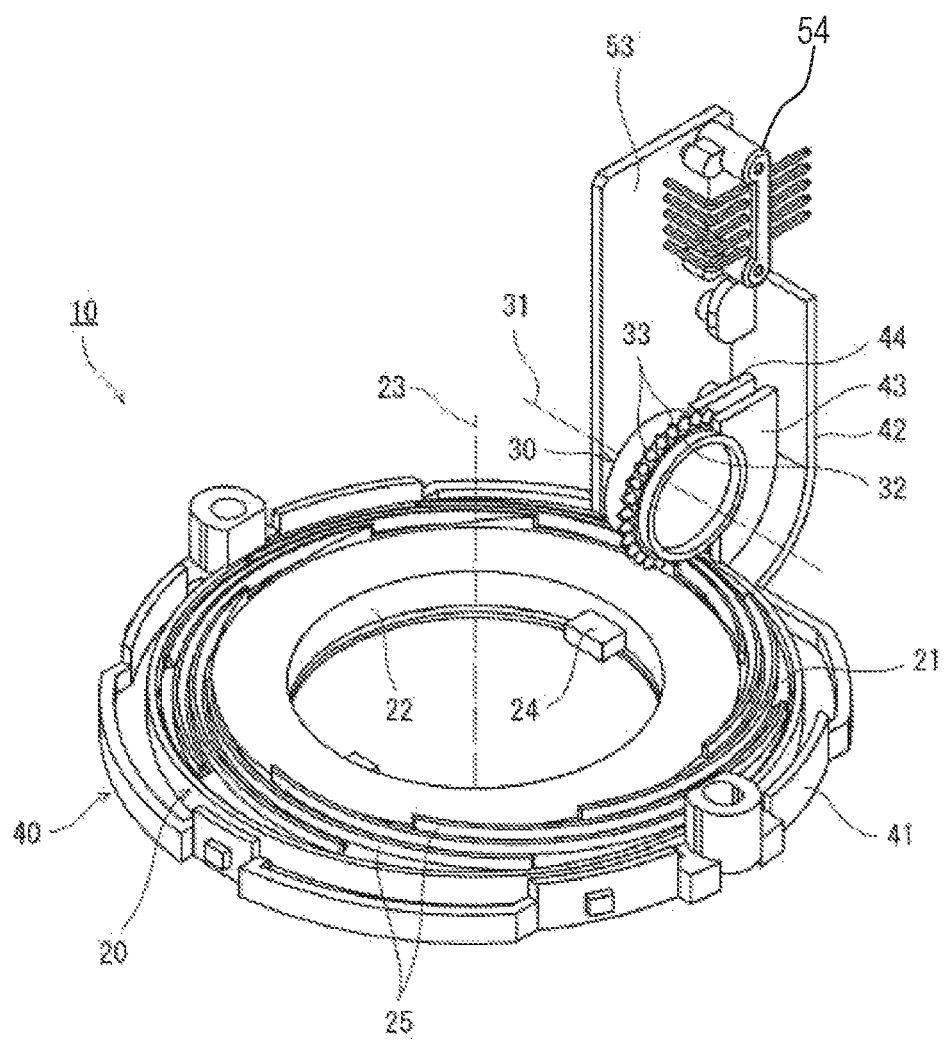
FIG. 7 is a perspective view illustrating a state where the part of the rotational angle detection device of FIG. 1 is contained in a case.
Figure 8:
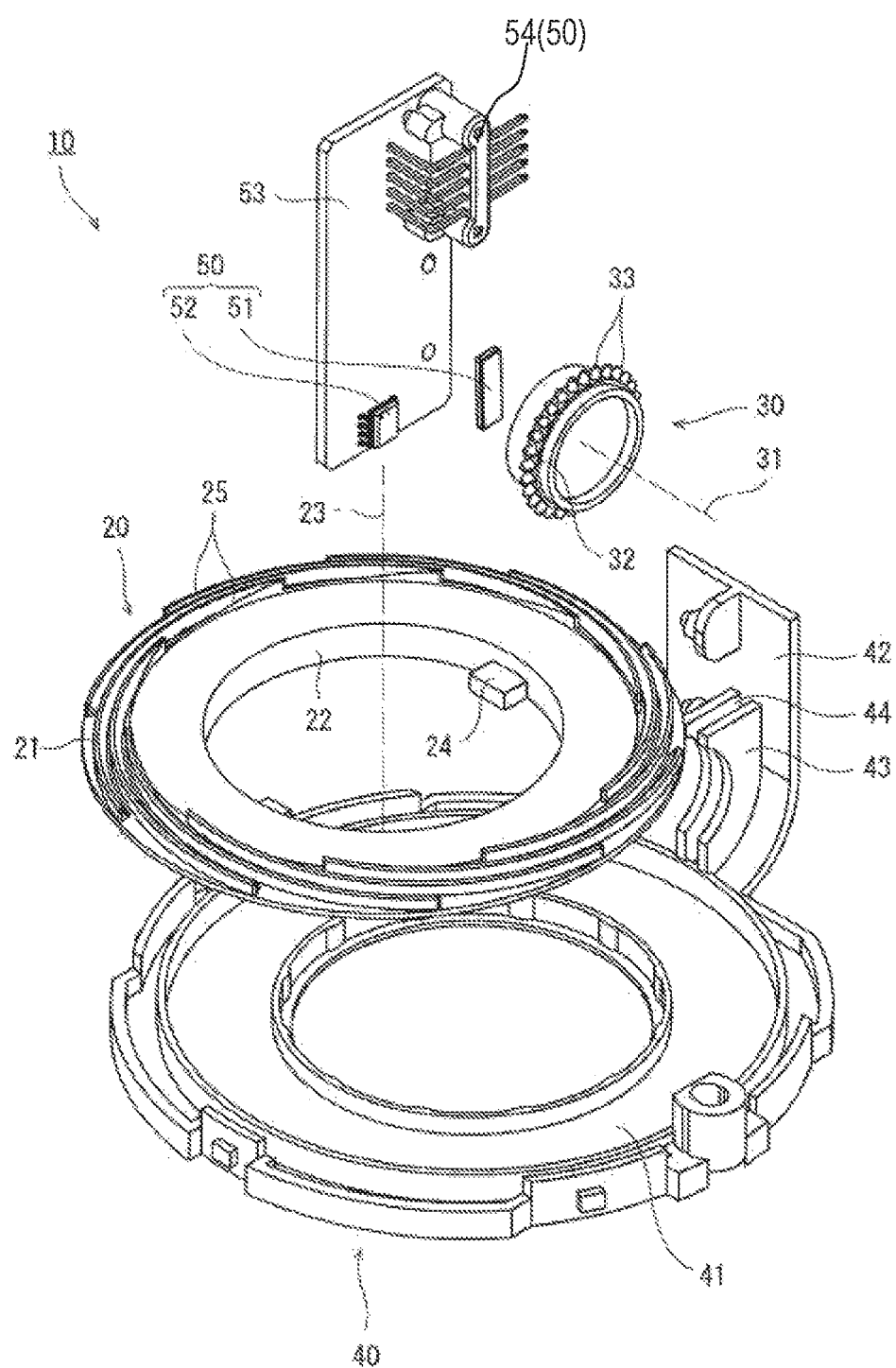
FIG. 8 is an exploded perspective view of the rotational angle detection device illustrated in FIG. 7.

First, a configuration of rotational angle detection device 10 according to the present exemplary embodiment is described with reference to FIGS. 1 to 8. FIG. 1 illustrates a state where first gear 20 and second gear 30 of rotational angle detection device 10 are engaged with each other, and FIG. 2A illustrates a state where second gear 30 is disengaged from first gear 20. FIGS. 2B and 2C are partial enlarged views of first gear 20 and second gear 30, respectively. FIGS. 3 through 5 are views viewed from arrows III, IV, and V illustrated in FIG. 1, respectively. FIG. 6A is a cross-sectional view taken along line VIA-VIA illustrated in FIG. 3, and FIG. 6B is a partial enlarged view of FIG. 6A. FIGS. 7 and 8 are a perspective view and an exploded perspective view of rotational angle detection device 10, respectively.

Rotational angle detection device 10 illustrated in FIG. 7 detects, for example, a rotational angle of an object to be detected (not illustrated) such as steering of a vehicle. Rotational angle detection device 10 detects, for example, a multiple-rotation rotational angle of 360 degrees or more of the object to be detected. Rotational angle detection device 10 has first gear 20 that rotates in accordance with rotation of the object to be detected and second gear 30 that rotates in engagement with first gear 20.

As illustrated in FIG. 1, first gear 20 is an annular flat plate having an opening on an inner side and rotates about first rotation axis 23. First gear 20 has an upper surface and a lower surface located on a side opposite to the upper surface. The upper surface constitutes main surface 21 having a predetermined width dimension in a radial direction, and the lower surface constitutes a bottom surface. First gear 20 further has inner circumferential surface 22 that connects main surface 21 and the bottom surface on an inner side. Inner circumferential surface 22 surrounds the inner opening of first gear 20.

Inner circumferential surface 22 is provided with one or more protrusions 24 that protrude toward first rotation axis 23. For example, two protrusions 24 are provided so as to face each other. Protrusion 24, for example, fits into a recess provided on an outer circumferential part of the object to be detected inserted into the inner opening and is thus locked by an edge of the recess. As a result, first gear 20 is fixed to the object to be detected in a circumferential direction (rotation direction) and rotates in association with rotation of the object to be detected accordingly.

Main surface 21 has an annular shape that crosses first rotation axis 23. Main surface 21 is provided with a plurality of first teeth 25. The plurality of first teeth 25 have an identical shape mutually. First teeth 25 are connected to main surface 21 at bottoms of first teeth 25. First teeth 25 protrude upward in FIGS. 1 and 2A from the bottoms toward tips of first teeth 25. Furthermore, each of first teeth 25 extends so as to shift from an outer side toward an inner side in the radial direction as it shift along a circumferential direction of main surface 21 (a clockwise direction in the present exemplary embodiment). That is, first end 25A and second end 25B of each of first teeth 25 are located at different angle positions in the circumferential direction of main surface 21 and are located at different radial positions also in the radial direction of main surface 21. Furthermore, first teeth 25 have an arc shape from first end 25A toward second end 25B. More specifically, first end 25A of each of first teeth 25 is located on an outer circumference of main surface 21, and second end 25B is located on an inner circumference of main surface 21. Each of first teeth 25 is shorter than the outer circumference of main surface 21 and is part of a spiral shape. FIG. 2A illustrates, as an example, a case where each of first teeth 25 is shorter than the inner circumference of main surface 21.

For example, in a case where n pieces of first teeth 25 are provided, first teeth 25 are provided at regular intervals such that an interval between first end 25A of each of first teeth 25 and first end 25A of first tooth 25 that is adjacent in the circumferential direction of main surface 21 is, for example, (360/n) degrees. Furthermore, each of first teeth 25 extends in the circumferential direction throughout a range wider than (360/n) degrees. Accordingly, a plurality of (two to three in the present exemplary embodiment) first teeth 25 are provided side by side in the radial direction of main surface 21, and each of first teeth 25 is disposed so as to overlap another adjacent first tooth 25 in the radial direction. First teeth 25 are disposed in parallel at regular intervals in the radial direction.

As illustrated in FIG. 2B, an end surface of each of first teeth 25 at first end 25A has a triangular shape such as an equilateral triangle or an isosceles triangle. A vertex of the triangle located at the tip of each of first teeth 25 is cut so that the tip and bottom of each of first teeth 25 are parallel with each other.

As illustrated in FIG. 3, each of first teeth 25 is configured so that a teeth width direction (longitudinal direction) in which first teeth 25 extend is inclined relative to the radial direction of first gear 20. That is, each of first teeth 25 has a shape such that a triangular prism is curved such that a longitudinal direction of the triangular prism has an arc shape and is twisted to a center.

Specifically, the tip of each of first teeth 25 is inclined downward from the inner circumference toward the outer circumference of main surface 21, as illustrated in FIGS. 6A and 6B. Furthermore, a distance between the tip and bottom of each of first teeth 25 is constant in the circumferential direction.

As illustrated in FIGS. 4 and 5, the plurality of first teeth 25 are disposed so that the tip of an inner one of first teeth 25 is higher than the tip of an outer one of first teeth 25 in any radial direction of first gear 20.

As illustrated in FIG. 1, second gear 30 has a cylindrical shape and rotates about second rotation axis 31. Second rotation axis 31 extends so as to be orthogonal to both of virtual line L and first rotation axis 23. Here, virtual line L connects center C of first gear 20 and a position where first gear 20 and second gear 30 are engaged. Virtual line L matches a normal line of the outer circumference of main surface 21 of first gear 20 and a radial direction of main surface 21, at the position where first gear 20 and second gear 30 are engaged. Center C of first gear 20 is located on first rotation axis 23 and is a point of intersection of first rotation axis 23 and main surface 21 (a center of main surface 21).

Second gear 30 has outer circumferential surface 32 that is parallel with second rotation axis 31. Outer circumferential surface 32 is provided with a plurality of second teeth 33. A number of second teeth 33 is larger than a number of first teeth 25. The plurality of second teeth 33 are arranged in a circumferential direction of outer circumferential surface 32. Each of the plurality of second teeth 33 is provided so as to protrude outward from outer circumferential surface 32 and protrude from a base (bottom) toward a distal end (tip) in a radiation direction about second rotation axis 31.

A part that an outer circumferential surface of each of second teeth 33 contacts with first teeth 25 and also adjacent second teeth 33 are mutually facing is a curved surface having an arc shape or the like in a circumferential direction of second teeth 33, in a case where a bottom side of second teeth 33 is viewed from the tip side. Furthermore, also in a case where second teeth 33 are viewed along second rotation axis 31 orthogonal to this direction, the part of the outer circumferential surface of each of second teeth 33 that contact with first teeth 25 is a curved surface having an arc shape or the like from the tip to the bottom. For example, as illustrated in FIG. 2C, each of second teeth 33 has a substantially circular truncated cone shape, and the part of each of second teeth 33 that makes contact with first teeth 25 has a circular arc shape in the circumferential direction of second teeth 33. Furthermore, a gap between adjacent two second teeth 33 is, for example, shorter than a diameter of the bottom of each of second teeth 33. As illustrated in FIG. 2D, part 33A that second teeth 33 contact with first teeth 25 may have an arc shape when a part from the tip to the bottom of each of second teeth 33 is viewed, and both sides of each of second teeth 33 in a direction parallel with second rotation axis 31 may be cut in substantially parallel with each other. That is, both end surfaces 33B of each of second teeth 33 illustrated in FIG. 2D disposed in second rotation axis 31 are substantially parallel with each other. As described above, the part of each of second teeth 33 that makes contact with first teeth 25 preferably has an arc shape from the tip toward the bottom of each of second teeth 33. This configuration increases a contact area between first teeth 25 and second teeth 33, thereby allowing first teeth 25 to smoothly deliver second teeth 33.

As illustrated in FIG. 3, a diameter of first gear 20 is larger than a diameter of second gear 30. In plan view, second gear 30 is disposed such that second rotation axis 31 is at a midpoint in the radial direction between first end 25A and second end 25B of first teeth 25 of main surface 21. Second teeth 33 are linearly arranged in the radial direction of first gear 20.

As illustrated in FIGS. 4 and 5, second gear 30 is provided above main surface 21 of first gear 20, and second teeth 33 do not protrude below main surface 21.

For example, as illustrated in FIGS. 6A and 6B, in a part where three first teeth 25 are arranged in the radial direction, one of second teeth 33 fits between innermost first tooth 25 and middle first tooth 25 adjacent to innermost first tooth 25. Furthermore, a part of second tooth 33 adjacent to fitting second tooth 33 fits between middle first tooth 25 and outermost first tooth 25 adjacent to middle first tooth 25.

As illustrated in FIG. 6B, inclination of the outer circumferential surface of each of second teeth 33 changes from the bottom side toward the tip side on a cross section that passes second rotation axis 31 and is orthogonal to second rotation axis 31. Specifically, inclination of the outer circumferential surface of each of second teeth 33 on the bottom side relative to a straight line extending in the radial direction passing second rotation axis 31 is smaller than inclination of the outer circumferential surface of each of second teeth 33 on the tip side relative to the straight line. Opposing surfaces of two adjacent second teeth 33 make contact with single first tooth 25.

As illustrated in FIGS. 7 and 8, first gear 20 and second gear 30 are placed on case 40. Case 40 has container 41 in which first gear 20 is contained and holder 42 that holds second gear 30. Container 41 has an annular shape slightly larger than main surface 21 of first gear 20, and first gear 20 is placed on an upper surface of container 41. First gear 20 is rotatable relative to container 41.

A lower end of holder 42 is connected to container 41. Holder 42 extends from the lower end toward the upper side in FIGS. 7 and 8 while being curved outward. Holder 42 has supports 43, 44 that are curved and protrude inward. Each of supports 43, 44 has a flat plate shape and is provided with a recess curved inward. Supports 43, 44 are disposed side by side with a gap therebetween in a direction in which second rotation axis 31 extends. This gap is larger than a length of each of second teeth 33 in the direction in which second rotation axis 31 extends. That is, this gap is larger than the diameter of each of second teeth 33 illustrated in FIG. 2C and is larger than a distance between both end surfaces 33B of each of second teeth 33 illustrated in FIG. 2D.

Supports 43, 44 sandwich second teeth 33 therebetween, and the inner curved recess makes contact with outer circumferential surface 32 of second gear 30. Supports 43, 44 thus rotatably hold second gear 30.

Note that another holder (not illustrated) is disposed on an inner side of first gear 20 as to sandwich second gear 30. The pair of holders support second gear 30 from the inner side and the outer side of first gear 20 to hold second gear 30.

Rotational angle detection device 10 further has sensor 50 that detects a rotational angle of second gear 30. Sensor 50 has magnet 51 attached to second gear 30, magnetism detection element 52 that detects magnetism of magnet 51, and controller 54 constituted, for example, by a microcomputer.

Magnet 51 is provided on a surface of second gear 30 that faces magnetism detection element 52 and rotates together with second gear 30. Magnetism detection element 52 is mounted on substrate 53 and detects magnetism of magnet 51 that changes in accordance with rotation of second gear 30. Controller 54 is mounted on substrate 53 and detects a rotational angle of second gear 30 and a rotational angle of first gear 20 based on a detection signal obtained from magnetism detection element 52.

Figure 9:
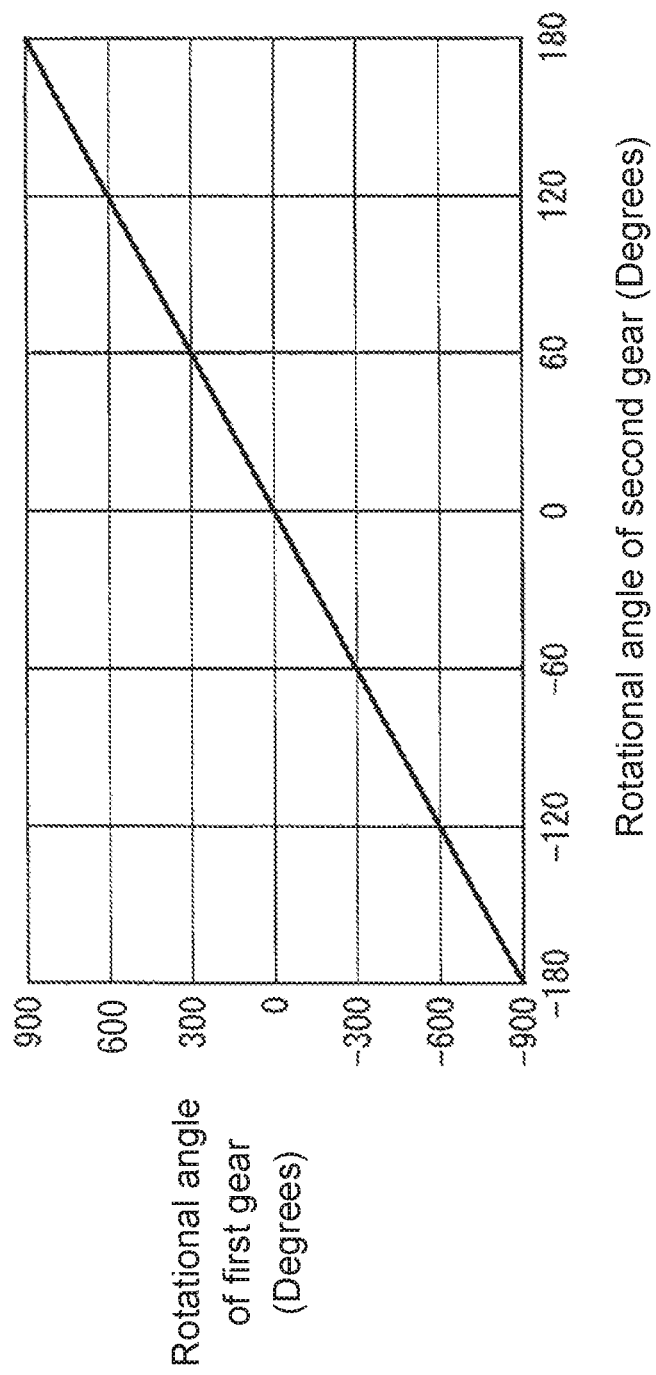
FIG. 9 is a graph illustrating an example of a relationship between a rotational angle of the first gear and a rotational angle of the second gear in the rotational angle detection device of FIG. 7.

For example, in a case where a number of teeth of first gear 20 is 10 and a number of teeth of second gear 30 is 50, first gear 20 rotates five times, whereas second gear 30 rotates one time. That is, as illustrated in FIG. 9, the rotational angle of first gear 20 changes in proportion to the rotational angle of second gear 30. Second gear 30 rotates by ±180 degrees, whereas first gear 20 rotates by ±900 degrees. It is therefore possible to detect a rotational angle of 360 or more (1800 degrees in the present exemplary embodiment) of first gear 20 and the object to be detected linked with first gear 20.

As described above, first teeth 25 of first gear 20 are provided so as to extend in the circumferential direction of main surface 21 with shifting from the outer side toward the inner side in the radial direction. Second gear 30 rotates in engagement with first gear 20 about second rotation axis 31. Second rotation axis 31 is orthogonal to first rotation axis 23 of first gear 20 and virtual line L. With the configuration, a ratio of a rotation number of first gear 20 to a rotation number of second gear 30 can be increased. For example, first gear 20 can be rotated by 360 degrees or more while second gear 30 rotates by 360 degrees. It is therefore possible to detect a rotational angle of 360 degree or more of first gear 20 and the object to be detected linked with first gear 20 by using single second gear 30. Furthermore, a number of magnets 51 and a number of magnetism detection elements 52 that detect rotation of second gear 30 in order to detect a rotational angle of the object to be detected can be reduced to 1. This can simplify the configuration and reduce cost.

Furthermore, since each of second teeth 33 has a substantially circular truncated cone shape, a part of each of second teeth 33 that makes contact with first teeth 25 has an arc shape. This increases a contact area between first teeth 25 and second teeth 33, thereby allowing first teeth 25 to more smoothly deliver second teeth 33.

Any of the exemplary embodiments described herein may be combined as long as no contradiction is produced between one another. It is apparent from the foregoing description that those skilled in the art will conceive various modifications and other exemplary embodiments on the present disclosure. It is accordingly understood that the foregoing description is merely interpreted as being illustrative and is given for the purpose of teaching those skilled in the art the best mode for carrying out the present disclosure. It is therefore possible to substantially change the details of the structure and/or function of the present disclosure without departing from the spirit of the present disclosure.

The rotational angle detection device according to the present disclosure is useful, for example, as a rotational angle detection device having a simple configuration that can detect a multiple-rotation rotational angle of 360 degrees or more of an object to be detected.

What is claimed is:

1. A rotational angle detection device comprising:
a first gear that is provided so as to be rotatable about a first rotation axis in accordance with rotation of an object to be detected and has a main surface and a plurality of first teeth, the main surface having an annular shape that crosses the first rotation axis, the plurality of first teeth being provided on the main surface;
a second gear that has second teeth greater in number than the first teeth, the second gear being provided so as to be rotatable about a second rotation axis in engagement with the first gear; and
a sensor that detects a rotational angle of the second gear,
wherein the second rotation axis extends in a direction orthogonal to both of a virtual line and the first rotation axis, the virtual line connecting a center of the first gear and a position where the first gear and the second gear are engaged with each other,
each of the plurality of first teeth extends so as to shift from an outer side toward an inner side in a radial direction of the main surface as it shifts along a circumferential direction of the main surface, and
adjacent two of the plurality of first teeth are disposed so as to overlap each other in the radial direction.

2. The rotational angle detection device according to claim 1, wherein
each of the plurality of second teeth is provided so as to protrude from a base toward a tip in a radiation direction about the second rotation axis; and
a part of each of the plurality of second teeth that makes contact with each of the plurality of first teeth has an arc shape from the tip toward the base of each of the plurality of second teeth.

3. The rotational angle detection device according to claim 2, wherein each of the plurality of second teeth has a substantially circular truncated cone shape.

4. The rotational angle detection device according to claim 2, wherein both end surfaces of each of the plurality of second teeth in a extending direction of the second rotation axis are substantially parallel with each other.

* * * * *